[19] United States Patent
Akagi et al.

[11] Patent Number: 4,530,374
[45] Date of Patent: Jul. 23, 1985

[54] LINEAR MOTOR-ACTUATED FLOW CONTROL VALVE

[75] Inventors: Motonobu Akagi, Kariya; Yasuhiro Kawabata, Anjo; Kyo Hattori, Susono, all of Japan

[73] Assignees: Aisin Seiki Kabushiki Kaisha, Kariya; Toyota Jidoshakogyo Kabushiki Kaisha, Toyota, both of Japan

[21] Appl. No.: 374,349

[22] Filed: May 3, 1982

[30] Foreign Application Priority Data

May 2, 1981 [JP] Japan .................................. 56-67346

[51] Int. Cl.$^3$ ........................ F16K 31/04; F16K 11/07
[52] U.S. Cl. .............................. 137/625.3; 137/625.33; 137/625.48; 251/65; 251/129; 251/139
[58] Field of Search ........................ 251/129, 65, 139; 137/625.39, 625.48, 625.65, 625.3, 625.33

[56] References Cited
U.S. PATENT DOCUMENTS

| | | |
|---|---|---|
| 4,056,178 | 11/1977 | Detty . |
| 4,216,938 | 8/1980 | Inada et al. . |
| 4,350,319 | 9/1982 | Kawata et al. ............. 137/625.48 X |
| 4,368,759 | 1/1983 | Akagi .............................. 137/625.48 |

Primary Examiner—Arnold Rosenthal
Attorney, Agent, or Firm—Burns, Doane, Swecker & Mathis

[57] ABSTRACT

A linear motor-actuated flow control valve includes: a casing having an inlet port and an outlet port; a moving-coil linear motor disposed within said casing, said linear motor including a hollow, ferromagnetic core which delimits the interior of said casing into valve chambers and which has a valve hole or holes for communicating said inlet and outlet ports with each other, a bobbin slidably disposed on said core for controlling the opening degree of the valve hole(s), an electromagnetic coil wound on said bobbin, a permanent magnet so arranged that the magnetic flux produced thereby extends axially of said electromagnetic coil, and a magnetic body for forming a magnetic circuit, in cooperation with said core, for the flux produced by said permanent magnet; and spring for biasing said bobbin so that said bobbin is retained at a predetermined position by said spring means when said electromagnetic coil is in the de-energized state, whereby said valve hole(s) is/are held open or closed to a predetermined degree, said spring serving as power supply lines for said electromagnetic coil, wherein the improvement comprises some of said valve holes, referred to a first valve hole(s), disposed at a position lying within said magnetic circuit along the length of said hollow ferromagnetic core, and a second valve hole(s) disposed at the other position(s) lying outside of said magnetic circuit along the length of said core.

12 Claims, 4 Drawing Figures

FIG. 2
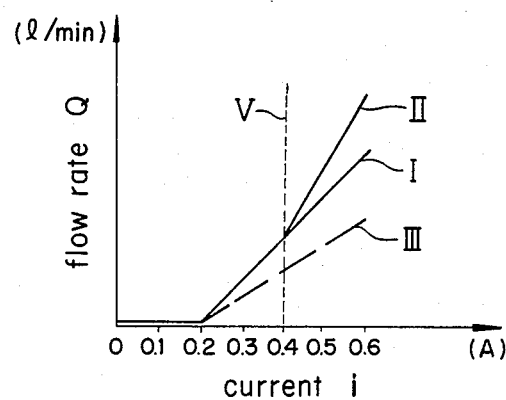
FIG. 3a
(PRIOR ART)
FIG. 3b
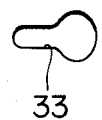
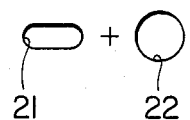

4,530,374

LINEAR MOTOR-ACTUATED FLOW CONTROL VALVE

BACKGROUND

This invention relates to a linear motor-actuated flow control valve assembly having an electromagnetically actuated and controlled moving-coil linear motor, and valve means for controlling the degree of communication between an inlet port and outlet port in accordance with the operation of the linear motor. More particularly, the invention relates to a valve assembly of the type described in which the flow rate between the two ports can be controlled in proportion to the electric current applied.

In general, a linear motor-actuated flow control valve of the aforementioned type includes a moving-coil linear motor which is arranged within a casing having an inlet port and an outlet port. The moving-coil linear motor comprises a hollow, ferromagnetic core which delimits valve chambers and which is provided with a valve hole for communicating the two ports, a bobbin, having an electromagnetic coil wound thereon, slidably disposed on the core for controlling the opening degree of the valve hole, permanent magnets so arranged as to produce a magnetic flux axially of the electromagnetic coil, and a ferromagnetic body for forming, together with the core, a magnetic circuit for the permanent magnets. The arrangement is such that passing an energizing current through the electromagnetic coil causes the bobbin to regulate the opening of the valve hole by moving the bobbin against a biasing force applied to the bobbin by spring means.

In the conventional linear-actuated flow control valve of the above kind, valve holes are disposed in a hollow ferromagnetic core (ordinally hollow iron core) forming a part of magnetic circuit for the permanent magnet. Namely both ports are communicated through valve holes which are circumferentially distributed at an angular distance along the periphery of the ferromagnetic core which is usually hollow and cylindrical. The opening degree of the valve holes is controlled by an end of the bobbin which is slidably disposed on the core. On one hand, the valve holes for controlling the flow rate should have such a given sectional area of the opening that a specific flow rate corresponding to a given electromagnetic force (namely the electric current) may be obtained, on the other hand it is required that the electromagnetic force should be correspondingly increased in order to obtain a given greater value of the opening degree of the valve holes. In spite of such requirements, there is a problem that a greater bobbin motive force can not be obtained owing to the saturation of magnetic flux caused by decrease in the sectional area of the magnetic circuit at the place where the valve holes are located even if a strong permanent magnet is used since the valve holes are disposed in the magnetic circuit. In other words, the increase in the sectional area of the opening of valve holes is apt to be contrary to the increase in the control electromagnetic force for increasing the opening of valve holes. This is a problem that it is difficult to design a valve assembly having a greater electromagnetic force.

This problem renders great obstruction to controlling the valve hole opening solely dependent upon the excitation current by presetting the control electromagnetic force with respect to a predetermined flow rate for the purpose of improving the control characteristics under application of shocks, namely preventing the valve from malfunction owing to shocks.

Furthermore, in a conventional arrangement of the valve holes the shape of valve holes is restricted based on that a given value of the sectional area of the magnetic circuit should be retained. Therefore, it is difficult to design any desired control characteristics since machining of two valve holes encounters difficulties depending upon the restriction in the shape of the valve holes.

SUMMARY OF THE DISCLOSURE

It is therefore an object of the present invention to provide a novel and improved linear motor-actuated flow control valve.

It is another object of the present invention to provide a linear motor-actuated flow control valve in which a greater magnetic force may be applied to the slidable bobbin.

It is a further object of the present invention to provide a linear motor-actuated flow control valve which allows a greater flow rate under a given control power.

Other objects of the present invention will become apparent from the entire disclosure of the application.

In accordance with the present invention there is provided a linear motor-actuated flow control valve of the aforementioned type in which some of the valve holes, referred to a first valve hole(s), is/are disposed at a position lying within said magnetic circuit along the length of the hollow ferromagnetic core, and a second valve hole(s) is/are disposed at the other position(s) lying outside of the magnetic circuit along the length of the core.

The inventive valve encompasses also the type which includes springs means biasing the bobbin severe as power supply lines for the electromagnetic coil. The first and second valve holes are controllable in accordance with the predetermined order. Also the first and second valves may open concurrently. Or either thereof may commence to open while the other(s) is/are in the midway to open. The opening degree of the valve holes are controllable in accordance with a predetermined flow rate characteristic curve. The second valve holes are regulated by a portion, preferably an end portion, of the bobbin, this bobbin portion lies opposite to the regulating portion for the first valve hole(s) with respect to the coil. The regulating portion of the bobbin is either a communicating hole(s) registable with the second valve hole(s) or the bobbin end portion lying on the side of the second valve hole(s).

The shape design of the first and second valve holes may be simplified by combining the first and second valve holes as illustrated in FIG. 3b which corresponds to or replacing for the valve hole shape as shown in FIG. 3a in the prior art. Through this manner, easy machining and also an increased flow rate at the higher or maximum opening degree can be achieved.

BRIEF DESCRIPTION OF THE DRAWINGS

FIG. 2 is a graph of a control characteristic according to the present invention, in which flow rate Q(l/min) is plotted against current (A);

FIGS. 3a and 3b show examples of the combination of the valve holes according to prior art and the present invention respectively.

Figure 1:
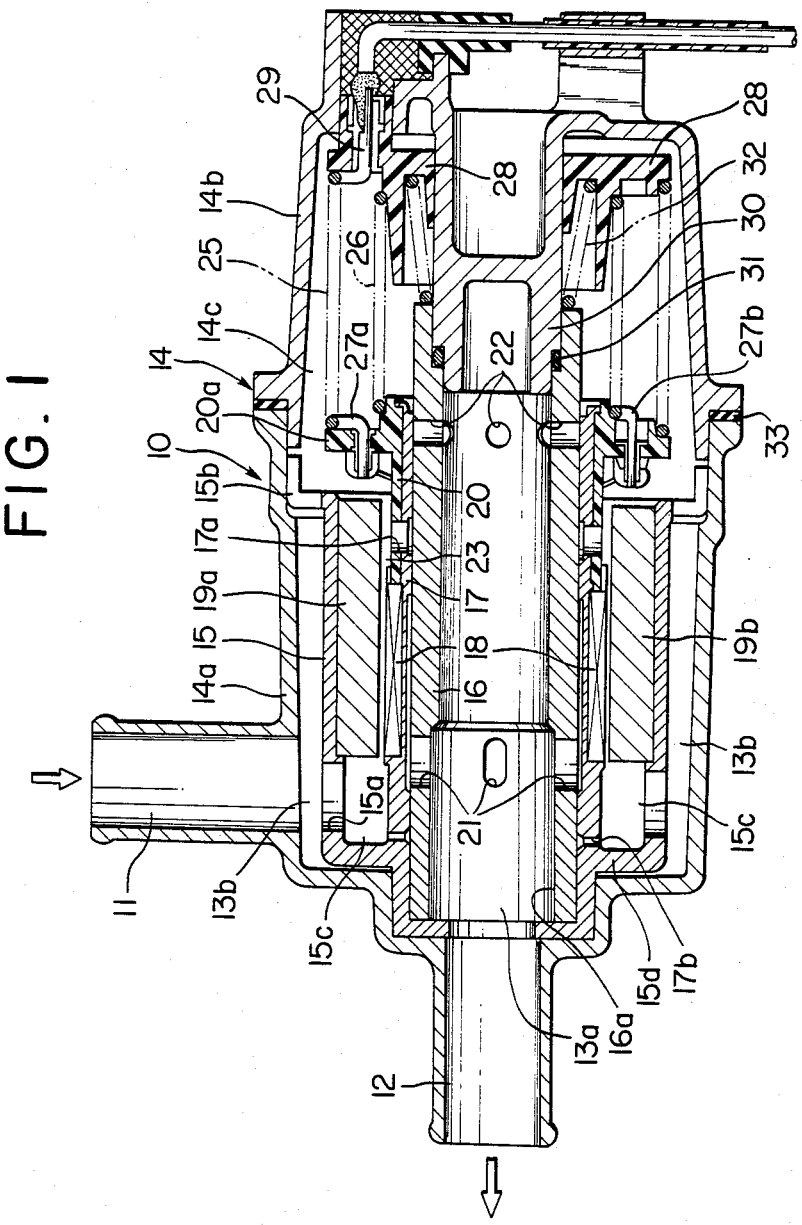
FIG. 1 is a longitudinal section view illustrating an embodiment of a linear motor-actuated flow control valve assembly according to the present invention.

In the following, preferred embodiments of the present invention will be described with reference to the accompanying drawings which serve to better illustration of the embodiments of the invention and not to limitation thereof.

DESCRIPTION OF THE PREFERRED EMBODIMENTS

An embodiment of the present invention will now be described in conjunction with the accompanying drawings.

In the embodiment illustrated in FIG. 1, a linear motor-actuated flow control valve assembly is shown generally at numeral 10. The valve assembly 10 includes a cylindrical casing 14 which comprises a casing section 14a of a non-magnetic material (such as an aluminum alloy) having an inlet port 11 and an outlet port 12, and defining a valve chamber 13b on the inlet port side, and a casing section 14b, also made of a non-magnetic material such as an aluminum alloy, hermetically fit in the casing section 14a through a sealing member 33. A hollow, ferromagnetic core 16 is disposed coaxially within the casing 14 in such fashion as to form a valve chamber 13a which communicates with the outlet port 12. Thus the hollow, ferromagnetic core 16 forms a partition between the two valve chambers 13a and 13b. Communication is established between these two valve chambers 13a and 13b by means of first valve holes 21 and second valve holes 22 formed in the wall of the core 16. The first valve holes 21 are located at a portion of the ferromagnetic core 16 that lies within a magnetic circuit formed by permanent magnets 19a and 19b, as will be described below. The second valve holes 22 are disposed at the other end of the core 16, namely at that portion thereof that does not lie within the magnetic circuit.

The valve assembly further includes a bobbin 17 consisting of a non-magnetic material, such as a synthetic resin or a metal sleeve encased with a synthetic resin. The bobbin 17 is slidably disposed on the core 16 so as to be capable of sliding axially thereof, and has an electromagnetic coil 18 wound on the central portion thereof. A pair of permanent magnets 19a and 19b are affixed to the inner side of an inner casing 15 comprising a magnetic material. The permanent magnets 19a and 19b are spaced away from the coil 18 to form an intervening clearance 23, and are so arranged that the magnetic flux produced thereby passes through the coil 18 at a right angle to the windings thereof. The inner casing 15, which has a compartment 15c formed internally thereof, is provided with a communicating hole 15a for communicating the internal ccompartment 15 with the valve chamber 13b on the inlet port side, and with a communicating hole 15b for communicating a compartment 14c, formed internally of the casing section 14b, with the valve chamber 13b. The end portion 15d of the casing 15 facing the outlet port 12 is provided with a flange for retaining the corresponding end of the ferromagnetic core 16 within the compartment 15c to fix the core 16 against movement. A magnetic circuit for the magnetic flux produced by the permanent magnets 19a and 19b extends from the inner surface of each permanent magnet, through the clearance 23 between each magnet and the coil 18, and further through the longitudinally extending wall of the core 16 before returning to the outer surface of each permanent magnet via the inner casing 15. Thus the magnetic flux crosses the windings of the coil 18 at a right angle.

The bobbin 17 slidably disposed on the core 16 is elongated at both ends to form lands which control the opening degree of the valve holes 21 and 22, and is provided with communicating holes 17a at the right-hand side of the coil 18 in order to communicate the compartment 14c with the valve holes 22. Thus the communicating holes 17a are adapted to open the valve holes 22. A cylindrical body 20 comprising an insulator (preferably a synthetic resin) is affixed to the bobbin 17 on the outer surface thereof to the right of the coil 18. The cylindrical insulator 20 has a flange 20a at the right-hand side thereof for affixing the two terminal leads 27 of the coil 18.

An annular spring holder 28, also comprising an insulator, is affixed to the interior of the casing section 14b at the right-hand end thereof, opposite the flange 20a of the cylindrical insulator 20, which is affixed to the bobbin 17. Coil springs 25 and 26 are disposed and compressed between the flange 20a and the spring holder 28. The coil springs 25 and 26 are connected at one end to respective ones of the coil terminal leads 27a and 27b, and at the other end to external connection terminals, only one of which, denoted at numeral 29, is shown. Thus the coil springs 25 and 26 serve to connect an external power supply to the electromagnetic coil 18.

The hollow, ferromagnetic core 16 terminates at its right-hand end at a point beyond the sliding range of the bobbin 17, and has said end fixedly supported on an inwardly projecting cylinder 30 formed on the non-magnetic casing section 14b. A sealing member 31 is interposed between the core 16 and projecting cylinder 30 to hermetically seal the joint between them. A spring 32 is disposed between the right-hand end of the core 16 and the spring holder 28 to urge the core 16 to the left. Thus the core 16 is supported centrally of the casing and is held against movement, its left end being retained by the flange of the inner casing 15, its right end being supported on the projecting cylinder 30.

A slit 17d preferably is provided at the left-hand extremity of the bobbin 17 in order to assure an equivalence in pressure on the inner and outer sides of the bobbin when the valve holes 21 and 22 are fully closed. The valve holes 21 and 22 may have the shapes shown in the sectional views of FIGS. 3a and 3b. The number of these valve holes formed in the wall of the core 16 will be based on the particular operating conditions.

The flow control valve 10 having the foregoing construction operates in the following manner. In FIG. 1 the valves assembly 10 is shown under the quiescent condition, that is, when the electromagnetic coil 18 is in the de-energized state. Under such condition, the bobbin 17 is biased in a leftward direction by the biasing force of coil springs 25 and 26 so that the valve holes are closed. When an energizing current is applied to the electromagnetic coil 18 to produce a repulsive force with respect to the permanent magnets 19a and 19b. The repulsive force slides the bobbin 17 toward the right until the magnetic repulsive force and the spring forces are in balance. The foregoing process in relationship with flow rate Q is depicted in FIG. 2. Curves I and II right of vertical line V are established by the fact that both the valve holes 22 open concurrently or simultaneously with the valve holes 21. The curve II depicts the flow rate characteristics when the sectional area of the valve holes 22 is larger than that in case of the curve I. The valve holes 21 begin to open when the energizing current reaches a predetermined value (0.2A in FIG. 2). The opening degree of the valve holes 21 increases with the increase in the energizing current. The valve holes 22 begin to open on reaching the vertical line V. At the maximum current, both valve holes 21 and 22 are fully opened. The curve III indicated by broken line depicts a linear flow control characteristic curve as employed in the prior art in which an energizing current equal to those in cases of curves I and II is applied. In order to obtain a given flow rate with the same current in conventional arrangement, the configuration of the valve holes must attain particular or abnormal one as valve hole 33 shown in FIG. 3a wherein the opening degree of the valve hole is increased at an increasing rate larger than that for the usual linear proportional relationship.

Increase in sectional area of the valve hole causes the effective magnetic flux passing the hollow ferromagnetic core 16 to decrease, resulting in a less repulsive force applied to the coil with the same energizing current. Namely only a valve hole opening degree smaller than that in the present invention can be provided in the prior art resulting in a low flow rate.

In contrast to the prior art, when the inventive flow control valve is employed under the same given flow rate as in the prior art, a larger coil repulsive force is produced in accordance with a given current. Accordingly, coil springs 25 and 26 having a high spring modulus are used to produce the balance with the repulsive force. In this instance, the valve can be more stable against the external disturbances such as shocks or vibration since the flow rate of the valve is controlled under the balance of larger forces. Furthermore, in the present invention it is possible to increase the slope of the flow characteristics curve from the intersection with the vertical line V and/or increase the opening sectional area (possibly by increasing the number of second valve holes 22). The valve holes 22 may be changed into various shapes, e.g., as shown in FIG. 3a or same as valve hole 21 in accordance with the desired flow rate characteristics. Self-explanatory is that any other desired shapes can be taken for the valve holes 22, in any desired combination with the valve holes 21. The position at the beginning of valve opening and the range of opening is suitably determined by the distance between the valve holes 21 and 22 and the design of the control land of the bobbin 17. The position of the communication hole 17a of the bobbin 17 corresponding to valve hole 22 determines the position of the vertical line V in FIG. 2. The communication hole 17a may be replaced by a land formed at the bobbin end or the like.

In the present invention it is not necessary to provide conventional valve holes 33 having a complicated configuration as shown in FIG. 3a. The present invention facilitates the valve hole machining and reduction in manufacturing cost of the valve because a suitable number of valve holes 21 and 22 may be combined. The first valve holes 21 and the land of the corresponding bobbin 16 should be machined at a high precision since the valve holes 21 for determining the flow rate at the initial rise-up time requires a high precision. The valve holes 22 may be machined with an usual tolerance since they do not require such a high precision.

Having described an embodiment of a valve which is closed when the coil is de-energized (normally closed), the principle of the present invention may be applicable also to a valve which is closed when the coil is energized (normally open). The roles of valve holes 21 and 22 may be reversed to those in the aforementioned embodiment.

The right portion of the core 16 comprise a casing 14b of a non-magnetic material (aluminum alloy etc.) and the spring retainer 28 (insulative material) for coil springs 25 and 26 so that the magnetic circuit is substantially not effectively produced in this embodiment.

The linear motor-actuated flow control valve of the present invention may be used as a valve for controlling air-fuel ratio of the internal combustion engine, for example an air-fuel ratio control valve in a by-pass in a carburator system for controlling the rotational speed of a engine in an idling state. In this case, the inlet and outlet ports 11 and 12 are connected to atmospheric and negative pressure sources, respectively, or vice versa. Alternatively the inventive valve may be used as a control valve connected between high and atmospheric pressure sources.

It is preferred that the relationship of the opening operation of the valve holes 21 with the valve holes 22 is such that the valve holes 22 is opened at the midway or half phase of the opening operation of the valve holes 21. Alternatively it is possible to hold the opening operation of the valve holes 22 after the closing of the valve holes 21. The number and the configuration of the valve holes 22 may be suitably changed in accordance with the present invention.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A linear motor-actuated flow control valve comprising:
    an outer casing having an inlet port and an outlet port;
    a moving-coil linear motor disposed within said casing, said linear motor including a hollow, ferromagnetic core which delimits the interior of said casing into valve chambers and which has at least one first valve hole and at least one second valve hole axially spaced apart from each other for communicating said inlet port with said outlet port, a bobbin slidably disposed on said core for controlling the opening degree of the first and second valve holes, an electromagnetic coil wound on said bobbin, a permanent magnet so arranged that the magnetic flux produced thereby extends axially of said electromagnetic coil, and a ferromagnetic inner casing contacting a first end of said core and said permanent magnet for completing a magnetic circuit, in cooperation with said core, for the flux produced by said permanent magnet, said permanent magnet superposing over a region of said core, which region terminates at a maximum distance from said first end, said first valve hole being axially positioned on said core at a distance from said first end less than said maximum distance, said second valve hole being axially positioned on said core at a distance from said first end greater than said maximum distance;

spring means for biasing said bobbin so that said bobbin is retained at a predetermined position by said spring means when said electromagnetic coil is in the de-energized state, whereby said first and second valve holes are held open or closed to a predetermined degree; and power supply lines to said coil.

2. A linear motor-actuated flow control valve comprising:

an outer casing having an inlet port and an outlet port;

a moving-coil linear motor disposed within said casing, said linear motor including a hollow, ferromagnetic core which delimits the interior of said casing into valve chambers and which has at least one first valve hole and at least one second valve hole axially spaced apart from each other for communicating said inlet port with said outlet port, a bobbin slidably disposed on said core for controlling the opening degree of the first and second valve holes, an electromagnetic coil wound on said bobbin, a permanent magnet so arranged that the magnetic flux produced thereby extends axially of said electromagnetic coil, and a ferromagnetic inner casing contacting a first end of said core and said permanent magnet for completing a magnetic circuit, in cooperation with said core, for the flux produced by said permanent magnet, said permanent magnet superposing over a region of said core, which region terminates at a maximum distance from said first end, said first valve hole being axially positioned on said core at a distance from said first end less than said maximum distance, said second valve hole being axially positioned on said core at a distance from said first end greater than said maximum distance; and spring means for biasing said bobbin so that said bobbin is retained at a predetermined position by said spring means when said electromagnetic coil is in the de-energized state, whereby said first and second valve are held open or closed to a predetermined degree, said spring means serving as power supply lines for said electromagnetic coil.

3. The valve as defined in claim 1 or 2, wherein said first and second valve holes open sequentially.

4. The valve as defined in claim 1 or 2, wherein said first and second valve holes concurrently open.

5. The valve as defined in claim 3, wherein said first and second valve holes commence to open such that one begins to open while the other is in the midway to open.

6. The valve as defined in claim 1 or 2, wherein the opening degree of said first and second valve holes are controlled in accordance with a flow rate characteristic curve.

7. The valve as defined in claim 1 or 2, wherein the second valve hole is disposed on the side where said spring means are located.

8. The valve as defined in claim 1 or 2, wherein there is a plurality of said second valve holes which are circumferentially disposed at an angular distance in the core.

9. The valve as defined in claim 1 or 2, wherein said second valve hole is regulated by a portion of said bobbin.

10. The valve as defined in claim 9, wherein said portion of said bobbin lies opposite to a regulating portion for said valve hole with respect to said coil.

11. The valve as defined in claim 9, wherein said regulation portion is at least one communicating hole registerable with said second hole.

12. The valve as defined in claim 9, wherein said regulating portion is an end portion of the bobbin lying on the side of the second valve hole.

* * * * *

UNITED STATES PATENT AND TRADEMARK OFFICE
CERTIFICATE OF CORRECTION

PATENT NO. : 4,530,374
DATED : July 23, 1985
INVENTOR(S) : Motonobu Akagi et al

It is certified that error appears in the above-identified patent and that said Letters Patent is hereby corrected as shown below:

Column 8, line 5, after "valve" insert -- holes --;

line 32, before "valve" insert -- first --;

line 34, delete "regulation" and insert "regulating --.

Signed and Sealed this

Twelfth Day of August 1986

[SEAL]

Attest:

DONALD J. QUIGG

Attesting Officer

Commissioner of Patents and Trademarks